(12) United States Patent
Allport

(10) Patent No.: US 6,757,001 B2
(45) Date of Patent: *Jun. 29, 2004

(54) METHOD OF USING PHYSICAL BUTTONS IN ASSOCIATION WITH A DISPLAY TO ACCESS AND EXECUTE FUNCTIONS AVAILABLE THROUGH ASSOCIATED HARDWARE AND SOFTWARE

(75) Inventor: David E. Allport, Palo Alto, CA (US)

(73) Assignee: Research Investment Network, Inc., Irvine, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,512

(22) Filed: Mar. 30, 1999

(65) Prior Publication Data

US 2002/0135619 A1 Sep. 26, 2002

(51) Int. Cl.[7] .................................................. G09G 5/00
(52) U.S. Cl. ........................ 345/840; 345/184; 345/864; 345/831
(58) Field of Search ................................ 345/184, 168, 345/172, 352, 353, 354, 902, 970, 864, 865, 866, 810, 813, 817, 825, 828, 835, 840, 831; 701/36, 99, 120; 702/108, 127; 725/37

(56) References Cited

U.S. PATENT DOCUMENTS

| 4,482,947 A | 11/1984 | Zato et al. ................... 364/138 |
| 4,626,892 A | 12/1986 | Nortrup et al. ................ 358/21 |
| 4,712,105 A | * 12/1987 | Kohler ................... 340/825.69 |
| 4,731,769 A | * 3/1988 | Schaefer et al. ................ 369/6 |
| 4,746,919 A | 5/1988 | Reitmeier .............. 340/825.56 |

(List continued on next page.)

OTHER PUBLICATIONS

Scottsdale Technologies, Inc.'s Users' Manual to Program Master Product, © 1996, 1997.

Rotel of America's User's Manual to Rotel R990 Product (approximately Oct., 1997).

(List continued on next page.)

*Primary Examiner*—Ba Huynh
(74) *Attorney, Agent, or Firm*—Kelli Masaki; Steve A. Wong; Micah P. Goldsmith

(57) ABSTRACT

In response to a display activation motion performed upon one button of a plurality of buttons, a description of a function associated with each button is displayed. In response to an execution activation motion performed upon any one button of the plurality of buttons, the function associated with that one button is executed.

23 Claims, 1 Drawing Sheet

U.S. PATENT DOCUMENTS

| | | | |
|---|---|---|---|
| 4,856,081 A | 8/1989 | Smith | 455/151 |
| 4,872,151 A | 10/1989 | Smith | 369/14 |
| 5,005,084 A | 4/1991 | Skinner | 358/194 |
| 5,031,046 A | 7/1991 | Bruggemann | 358/194.1 |
| 5,038,211 A | 8/1991 | Hallenbeck | 358/142 |
| 5,075,771 A | 12/1991 | Hashimoto | 358/84 |
| 5,086,385 A | 2/1992 | Launey et al. | 364/188 |
| 5,093,718 A | 3/1992 | Hoarty et al. | 358/84 |
| 5,146,210 A | 9/1992 | Heberle | 340/709 |
| 5,148,015 A * | 9/1992 | Dolan | 250/251 |
| 5,148,159 A | 9/1992 | Clark et al. | 340/825 |
| 5,223,924 A | 6/1993 | Strubbe | 358/86 |
| 5,228,077 A | 7/1993 | Darbee | 379/102 |
| 5,251,034 A | 10/1993 | Na | 358/183 |
| 5,315,391 A | 5/1994 | Lee | 348/553 |
| 5,315,392 A | 5/1994 | Ishikawa et al. | 348/570 |
| 5,343,239 A | 8/1994 | Lappington et al. | 348/12 |
| 5,353,121 A | 10/1994 | Young et al. | 348/563 |
| 5,379,421 A | 1/1995 | Palazzi, III et al. | 395/600 |
| 5,398,045 A * | 3/1995 | Sach et al. | 345/172 |
| 5,410,326 A | 4/1995 | Goldstein | 348/134 |
| 5,422,677 A | 6/1995 | Do | 348/568 |
| 5,450,079 A | 9/1995 | Dunaway | 341/23 |
| 5,455,570 A | 10/1995 | Cook et al. | 340/825.22 |
| 5,465,385 A | 11/1995 | Ohga et al. | 455/6.1 |
| 5,479,268 A | 12/1995 | Young et al. | 358/335 |
| 5,481,542 A | 1/1996 | Logston et al. | 370/94.2 |
| 5,500,691 A | 3/1996 | Martin et al. | 348/734 |
| 5,500,794 A | 3/1996 | Fujita et al. | 364/188 |
| 5,515,347 A | 5/1996 | Mulder et al. | 369/30 |
| 5,517,257 A | 5/1996 | Dunn et al. | 348/734 |
| 5,537,107 A | 7/1996 | Funado | 340/825.72 |
| 5,543,781 A * | 8/1996 | Ganucheau, Jr. et al. | 340/825.44 |
| 5,543,857 A | 8/1996 | Wehmeyer et al. | 348/589 |
| 5,545,857 A | 8/1996 | Lee et al. | 178/18 |
| 5,548,338 A | 8/1996 | Ellis et al. | 348/473 |
| 5,557,338 A | 9/1996 | Maze et al. | 348/565 |
| 5,561,708 A | 10/1996 | Remillard | 379/96 |
| 5,585,866 A | 12/1996 | Miller et al. | 348/731 |
| 5,589,892 A | 12/1996 | Knee et al. | 348/731 |
| 5,592,551 A | 1/1997 | Lett et al. | 380/20 |
| 5,594,509 A | 1/1997 | Florin et al. | 348/731 |
| 5,596,373 A | 1/1997 | White et al. | 348/569 |
| 5,600,368 A | 2/1997 | Matthews, III | 348/143 |
| 5,608,389 A | 3/1997 | Matsuzawa | 340/825.57 |
| 5,612,719 A * | 3/1997 | Beernink et al. | 345/173 |
| 5,621,456 A | 4/1997 | Florin et al. | 348/7 |
| 5,629,733 A | 5/1997 | Youman et al. | 348/7 |
| 5,630,119 A | 5/1997 | Aristides et al. | 395/601 |
| 5,630,757 A | 5/1997 | Gagin et al. | 463/43 |
| 5,633,912 A * | 5/1997 | Tsoi | 379/58 |
| 5,648,760 A | 7/1997 | Kumar | 340/825.25 |
| 5,648,824 A | 7/1997 | Dunn et al. | 348/734 |
| 5,652,613 A | 7/1997 | Lazarus et al. | 348/7 |
| 5,657,072 A | 8/1997 | Aristides et al. | 348/13 |
| 5,661,632 A * | 8/1997 | Register | 361/683 |
| 5,671,267 A | 9/1997 | August et al. | 379/61 |
| 5,686,954 A | 11/1997 | Yoshinobu et al. | 348/13 |
| 5,689,663 A | 11/1997 | Williams | 395/327 |
| 5,710,601 A | 1/1998 | Marhsall et al. | 348/564 |
| 5,710,605 A | 1/1998 | Nelson | 348/734 |
| 5,721,583 A | 2/1998 | Harada et al. | 348/12 |
| 5,724,069 A * | 3/1998 | Chen | 345/172 |
| 5,758,259 A | 5/1998 | Lawler | 455/5.1 |
| 5,761,606 A | 6/1998 | Wolzien | 455/6.2 |
| 5,793,438 A | 8/1998 | Bedard | 348/569 |
| 5,797,091 A * | 8/1998 | Clise et al. | 455/404.2 |
| 5,801,747 A | 9/1998 | Bedard | 348/1 |
| 5,850,304 A | 12/1998 | Elmers et al. | 359/142 |
| 5,886,732 A | 3/1999 | Humpleman | |
| 5,916,288 A | 6/1999 | Hartman | 701/36 |
| 5,956,034 A * | 9/1999 | Sachs et al. | 345/350 |
| 5,977,955 A * | 11/1999 | Jaeger | 345/172 |
| 5,991,690 A * | 11/1999 | Murphy | 701/211 |
| 6,078,323 A * | 6/2000 | Gest | 345/348 |
| 6,091,675 A * | 7/2000 | Lee | 369/33 |
| 6,104,334 A * | 8/2000 | Allport | 341/175 |
| 6,286,142 B1 | 9/2001 | Ehreth | |
| 6,340,987 B1 | 1/2002 | Hayashi | |
| 6,496,122 B2 * | 12/2002 | Sampsell | 340/825.69 |

OTHER PUBLICATIONS

Page from product brochure of Marantz RC2000 Product, "RC Learning Remote" (approximately Aug. 1996).

Lexicon, Inc.'s product brochure for Lexicon 500T Product, "Take Control. The Lexicon 500T System Controller", © 1994.

Niles Audio Corporation, Inc.'s product brochure, "Intellicontrol Home Theater Automation System", Aug. 1996.

Full House Control Corporation, "The RF Base Station™", © 1997 (pages from website: www.fullhouse.com/base.html), Apr. 29, 1998.

Full House Control Corporation, "RHOC™ for Windows", © 1997 (pages from website: www.fullhouse.com/rhocwin.html), Apr. 29, 1998.

Kenwood U.S.A., "KC–Z1 Stage 3 Home Theater Controller", (pages from website: www.kewoodusa.com/cat . . . Stage 3 Components/KC–Z1.htm), Apr. 28, 1998.

Sony's Product Promotion Flyer for "Free Keyboard with purchase of the CPD–CX270 and CPD–CX90ES", (approximately Jun., 1997).

Audio Advisor Magazine, "New Pioneer Audiolab CD Players", Nov. 1997, p. 24.

Stereo Review Magazine, "Sony Vision Touch PC Interface and 200–Disc Changer", Sep. 1997, pp. 83–85.

Innovation Device Technologies, Inc. Executive Investment Summary (pages from website: www.innovativedevice.com/execsum.htm), Apr. 29, 1998.

Aplix Corporation, "Blue Mountain with Jblend", (pages from website: www.jBlend.com/products/bm.html), Apr. 29, 1998.

WebTV Networks, "WebTV Backgrounder", (pages from website: www.webtv.net/ns/about/backgrounder.html), May 4, 1998.

* cited by examiner

METHOD OF USING PHYSICAL BUTTONS IN ASSOCIATION WITH A DISPLAY TO ACCESS AND EXECUTE FUNCTIONS AVAILABLE THROUGH ASSOCIATED HARDWARE AND SOFTWARE

RELATED APPLICATIONS

The present application is related to U.S. patent application Ser. No. 09/001,873, titled "Portable Internet-Enabled Controller And Information Browser For Consumer Devices", (hereinafter referred to as "the '873 application"), and to U.S. patent application Ser. No. 09/001,841, titled "System For Dual-Display Interaction With Integrated Television And Internet Content", (hereinafter referred to as "the '841 application"), both filed on Dec. 31, 1997. The aforementioned applications have issued as U.S. Pat. Nos. 6,104,334 on Aug. 15, 2000, and 6,097,441 on Aug. 1, 2000, respectively. The present application is also related to U.S. patent application Ser. No. 09/221,940, titled "Method of Data Display For Electronic Program Guides (EPGs), (hereinafter referred to as "the '940 application"), filed on Dec. 28, 1998. The disclosures of all of the above-referenced related applications are incorporated herein by reference.

FIELD OF THE INVENTION

The present invention relates generally to efficient use of display space on a data display device. More particularly, the present invention relates to methods of using physical buttons to access functions available from software and hardware associated with the display device, without necessarily using the display space on the display device to indicate the available functions until prompted to do so by a user.

DEFINITIONS

As used in this application, "button" refers to various types of buttons, such as push buttons, touch-buttons, switches, sliders, knobs, dials, trackballs, mice, levers, pads, etc. Various buttons are described and shown in more detail in the '873 application. The phrase "button set" is used herein to describe a plurality of buttons, which, when activated in combination, have a single effect as if the button set were a single physical button. For example, activating two separate physical buttons substantially simultaneously may initiate a first function, whereas activating the same two buttons with a third button substantially simultaneously may initiate a second function. Unless the context indicates otherwise, whenever the display or function of a button is discussed, it is to be understood that the discussion also includes a button set.

"Activate" as used herein means to perform the required act or acts on a button that indicate to a device associate with the button, that the button has been engaged. For example, "activate" may refer to pushing, touching, switching, sliding, turning, dialing, rolling, clicking, etc., depending on the physical characteristics of the button involved.

A particular button may have a variety of physical motions associated therewith that could cause activation thereof, perhaps for different purposes. For example, activation of a button by a first type of physical motion (e.g., pushing forward) may cause a first event to occur, such as displaying information on the display to describe a function of the button. An activation causing this type of event is referred to herein as a "display activation", and the motion associated therewith is referred to herein as a "display activation motion". An activation of the same button by a different type of physical motion (e.g., pushing downward) may cause a second event to occur, such as executing a function associated with the button. An activation causing this type of event is referred to herein as an "execution activation", and the motion associated therewith is referred to herein as an "execution activation motion". A particular motion associated with a particular button may be a display activation motion, an execution activation motion, or another type of motion, due to a predetermined or programmed association.

Also in this application, the terms "user", "viewer", and "consumer" are used interchangeably depending on the context, to refer to a person using the methods and devices described herein. A user may be a "logical user". A "logical user" may be a single user, or a group of users having shared or aggregated program preferences. For example, "kids" may be a logical user, for which program preferences are determined by a parent. Or "critics' choice" may be a logical user, for which program preferences are determined by a group of program critics. Or "default" may be a logical user, for which program preferences are determined by a predetermined or random algorithm.

As used in this application, the term "action" refers to any sequence of events performed or required to be performed by a user to display, access, and/or execute an available function. Actions include, but are not limited to, keyboard events (e.g., touching or pressing a key or keys simultaneously or in sequence), mouse events (moving, right- or left-clicking, double-clicking, dragging, etc.), actuating a button (e.g., pressing, releasing, sliding, toggling, squeezing, etc.), screen events (e.g., touching a screen), and any other event in which a signal or other data is input to a device in response thereto.

BACKGROUND

Many electronic and other devices have various functions associated therewith, and access to those functions may occur through a wide variety of mechanisms. Numerous combinations of physical buttons and software or on-screen buttons are provided to enable users to access available functions. Although eventually a user may memorize the actions required to access and execute some or all of the available functions, prior to that point there needs to be a way to communicate the information to the user. Typically, there is a separate User's Guide, cheat-sheet, display screen or other visual indicator associated with the device that is used for that purpose.

A simple example is a personal computer, used in combination with a keyboard, mouse, or other data input device, a display monitor, and associated software. It is well-known in the art of personal computing to use industry standard keys (such as ALT, CTRL, SHIFT, Apple Command, and Windows Command) in combination with other available keys, to access and execute a desired function. Similarly, it is well-known to use Function keys, such as F1, F2, etc., or to use a mouse to point-and-click or point-and-double-click a specified icon or menu option to access and/or execute a function associated therewith.

In each of the above-mentioned situations, however, the functions associated with a particular keystroke sequence or other input action are typically displayed in response to a first action or set of actions, and then the desired function is executed by use of a second action or set of actions. For example, it is common for application software programs to have help icons or help menus, which are accessible by a particular mouse or keyboard sequence. Once within the help module, a user can navigate to determine a second set of actions required to perform the desired function. Many times this even requires a user to engage the use of various cooperating input devices, such as a mouse to point to the menu, and then a keyboard to navigate through the menu and eventually access and execute the desired function.

An example of a dual-function button wherein two functions are performed from the same button, is a shutter button on some types of cameras. On SLR cameras that have manual focus but automatic exposure control, typically pressing the shutter button half-way will give an indication of what the exposure rate will be, and following through and fully depressing the shutter button result in the picture being taken. Similarly, on many auto-focus cameras, depressing the shutter half-way causes the auto-focus mechanism to set for the subject currently in view, and full shutter depression then takes the picture. The functions of these "dual-function" buttons on cameras, however, are not programmable.

Another dual-function functionality known as "tool tips' is common in software. Tool tips are short pop-up textual descriptions associated with visual icons. The icons represent buttons that provide different kinds of program functionality such as opening, saving, or printing files. If a user moves the mouse over these icons and holds it there for a second or two, the text description pops up telling the user what the button will do if the user subsequently clicks on it. These tool-tips are similar to the "balloon help" provided with Macintosh computers, and they are common in programs such as Microsoft Word.

Tool-tips may be useful user interface devices in standard computer applications, because they enable novice users to simply point to an on-screen icon, and find out what it will do. For more experienced users, they can simply click on the icon representing the functional tool, without waiting for the description of the function to pop up. However, there are at least two major drawbacks to tool-tips. First, they depend on a "mouse and keyboard" input metaphor, where it is possible to point the mouse at an icon without clicking on that icon. However, for devices with graphical touch-screens, the natural interaction method is to point one's finger at an icon by touching the screen, and have it activated immediately. In this case, there is no distinction possible between "pointing" and "clicking". Some touch-screen-based applications do create this distinction using a pen, and requiring that the pen be tapped twice in quick succession in order to create a "click", whereas just touching the pen once to the touch-screen surface constitutes a "point". But this is an awkward interaction style, especially if one is using one's finger instead of a physical pen.

Another significant drawback with tool-tips is that they take up screen display space. For each function button to which one wishes to attach a tool-tip, it is necessary to provide an icon, such that pointing to it will cause the textual description to pop-up. In the context of a small-screen display, the continuous display of such icons uses up precious display space resources even when the icons are not in use.

The Palm Pilot, by 3-Com, Corporation, has a small touch-screen and a small number of physical buttons. However, the Palm Pilot's physical buttons are dedicated to always performing a single operation. The buttons are not at all versatile. They simply switch between four primary program application screens, and have no other use.

A desirable method of overcoming the above-referenced drawbacks in the prior art is to provide physical buttons on the devices, that may be programmable, wherein a function of each button or combination of buttons (button set) is displayed on an associated display when said button or button set is activated using a display activation motion, and a function of the button or button set is executed when the button or button set is activated using an execution activation motion, different than the display activation motion. This would allow the display to be free of unnecessary icons, menus, text, etc., and to be devoted to actual content, unless and until a user has a need or desire to view information related to the function of a button associated with the device containing the display.

SUMMARY OF THE INVENTION

As technology has been advancing at a rapid pace, devices have become increasingly small in size, and many such devices exist with fully integrated input, processing, and display features, in a compact device suitable for being hand-held and operated. For example, hand-held calculators and hand-held video games have existed for many years, and more recently hand-held electronic organizers such as 3-Com Corporation's Palm Pilot have become available. In addition, the '873 application discloses a hand-held remote controller for consumer devices, having an integrated display.

As the size of these electronic devices has been decreasing, the degree of functionality associated with them has been increasing. This is due to better technology, market demand, and other factors. With these smaller devices, both the display area and the available space for physical buttons are limited, and it is therefore desirable to make efficient use of the space available in both respects. It thus becomes important to pack a high degree of functionality into such devices, using a relatively small number of physical buttons, and without using valuable display space to display to the user what the functions of each button are.

The present invention accomplishes these goals by providing physical buttons (preferably programmable) on the devices, wherein the function of each button or button set is displayed on an associated display when said button or button set is activated using a display activation motion, whereas the function of the button or button set is executed when the button or button set is activated using an execution activation motion, different than the display activation motion, wherein the execution activation motion is not necessarily preceded by the display activation motion.

The present invention thus provides systems and methods to allow maximally efficient use of screen space on these types of devices, while preserving maximal ease-of-use for consumers. The display space on an associated device is thus free from unnecessary clutter for experienced users familiar with the functions of the buttons, and the experienced user is thus required to perform only an execution activation motion associated with the button, never having to take time or waste display space associated with performing a display activation motion associated with the button. At the same time, less experienced users may enjoy the clutter-free display until they need to check to see what function a particular button or set of buttons performs, in which case they can simply perform a display activation motion in which case indications of the appropriate functions will appear on the display temporarily. The user may then perform an execution activation motion on the desired button or button set, to perform the desired function. Alternatively, the user may activate an escape sequence to clear the clutter from the display, or may perform a display activation motion on a second button or button set to see what function is associated with the second button or button set, or may simply wait for a suitable amount of time of non-activity to occur for the display to clear itself from clutter. Non-activity refers to no other buttons being activated on the device, and a suitable time may be either predetermined or programmed.

Thus, one aspect of the present invention involves using a first physical button on a device, in association with a display, to display and execute a function associated with the first physical button, by performing a display activation motion associated with the first physical button upon the first physical button; displaying on the display, in response to the display activation motion performed upon the first physical button, a description of a function associated with the first physical button; performing an execution activation motion associated with the first physical button upon the first physical button; and executing, in response to the execution activation motion performed upon the first physical button, the function associated with the first physical button; wherein the display activation motion associated with the first physical button is of a different type than the execution activation motion associated with the first physical button.

Another aspect of the present invention involves using a first physical button on a device comprising the first physical button and a second physical button, in association with a display, to display and execute a function associated with the first physical button, by performing a display activation motion associated with the first physical button upon the first physical button; displaying on the display, in response to the display activation motion performed upon the first physical button, a description of a function associated with the first physical button; displaying on the display, in response to the display activation motion performed upon the first physical button, a description of a function associated with the second physical button; performing an execution activation motion associated with the second physical button upon the second physical button; and executing, in response to the execution activation motion performed upon the second physical button, the function associated with the second physical button.

Another aspect of the present invention involves using a first physical button set on a device comprising the first physical button set and a second physical button set, in association with a display, to display and execute a function associated with the first physical button set, by performing a display activation motion associated with the first physical button set upon the first physical button set; displaying on the display, in response to the display activation motion performed upon the first physical button set, a description of a function associated with the first physical button set; displaying on the display, in response to the display activation motion performed upon the first physical button set, a description of a function associated with the second physical button set; performing an execution activation motion associated with the second physical button set upon the second physical button set; and executing, in response to the execution activation motion performed upon the second physical button set, the function associated with the second physical button set.

Thus, the systems and methods of the present invention allow the use of a display that is free of unwanted clutter typically present to describe the functions of physical buttons. The systems and methods of the present invention also provide a user with the ability to determine the function of a button if desired, and to have the function executed either with or without having first performed a display activation motion.

Other objects and advantages of the present invention will be apparent from the detailed description which follows, when read in conjunction with the associated drawings.

DETAILED DESCRIPTION OF THE INVENTION

Figure 1:
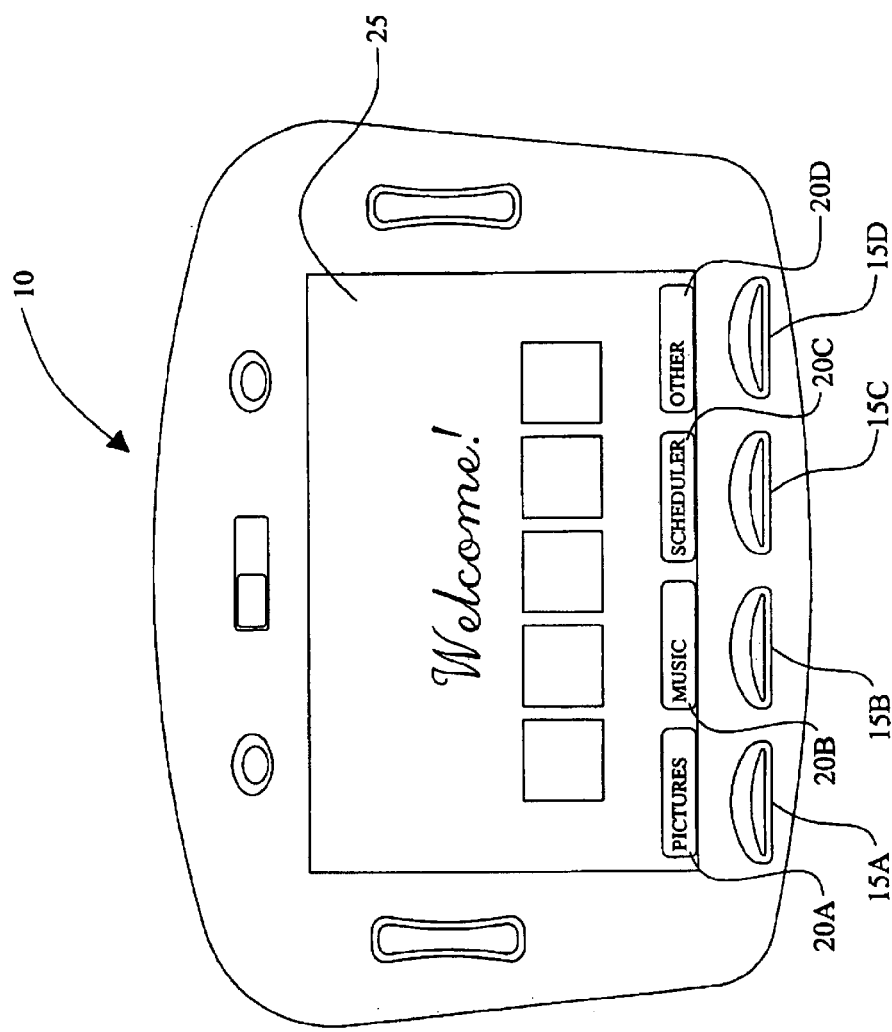
FIG. 1 shows a hand-held device having physical buttons and a display area, as an example of a device embodying the concepts of the present invention.

For devices such as those described in the '873 application (titled "Portable Internet-Enabled Controller And Information Browser For Consumer Devices") the use of physical buttons was described on hand-held devices to perform different program functions, including navigation, on different application screens. "Hand-held" refers generally to the size and weight of the device, and is used to indicate that the device may generally be held and/or operated using a single hand. Sometimes the buttons perform functions related to a particular screen such as playing a CD or scrolling the contents of a program display. In other cases the buttons switch between different screens, for example between a "welcome screen" and a "pictures" screen. A preferred embodiment of the present invention is used in conjunction with the hand-held devices described in the '873 application. Those devices have a display, and associated integrated programmable software used in conjunction therewith, such that the devices may act as intelligent interactive remote controllers for consumer devices.

In general the function buttons described in the '873 application are very versatile, but a user may often need to be reminded of what the buttons do in a particular context. In response to this concern, it is common to always have a graphical display continuously indicating the current functionality of each button. FIG. 1 shows a sample device 10 having physical buttons 15a, 15b, 15c, and 15d, corresponding graphical labels 20a, 20b, 20c, and 20d, which indicate the functions of their associated physical buttons 15, and a display area 25 displaying a "welcome" screen. The device 10 is a sample of a device described in the '873 application.

There appears to be no problem with overcrowding on the "welcome" screen shown in FIG. 1, but on other screens, even on the same display area 25, the labels 20 occupy screen space that might otherwise be used for showing more content-related information. Such other screens may include a screen displaying Electronic Program Guide information, or a screen listing a user's CD collection.

The present invention allows users to "reclaim" the display space taken up by labels 20 for the content information, whilst retaining the user's ability to quickly see what each button 15 is used for if the user so desires. The buttons 15 preferably have multiple distinct physical motions, movements or activation requirements associated therewith. Preferably there are exactly two distinct motions that effect actuation of the button 15, but there may be three, or four, or five, or six, or even more. In the embodiment where a button has exactly two distinct physical motions associated therewith that effect actuation thereof, it is preferred that one of the motions is a display activation motion, while the other is an execution activation motion.

Various buttons 15 may have various amounts of distinct movements (e.g., some may have two movements, some may have three movements, etc.). Also, preferably each button 15 in and of itself has a multiple-function characteristic, but the multiple-function characteristic may be associated with a button set, such as two particular buttons (e.g., 15a and 15b), or three particular buttons (e.g., 15a, 15b, and 15c), or some other combination of buttons 15. With button sets, buttons 15 may have various shapes, contours, thicknesses, sizes, colors, physical actuation requirements (i.e. push, slide, roll, switch, touch, etc), or other attributes, such that there are distinct classes or kinds of buttons 15. Specific combinations of shapes, colors, etc., may be programmed to perform desired functions. For example, if there are four round buttons 15, then performing a display activation motion on any two may result in the display of a first function, any three may result in the display of a second function, and all four in the display of a third function. Performing an execution activation motion on any two, three, or four would execute the associated function. Each individual round button 15 could still correlate to a separate and unique function.

Turning back to the embodiment wherein a particular button 15 has two distinct activation motions associated therewith, an example is that a first activation requirement could be sliding the button 15 forward towards the display area 25, while the second activation requirement could be pressing down on the button 15, or vice versa. Note, however, that the same advantages apply with other types of dual movement, such as moving down half-way then down all the way, or forward half then full, or twisting right then left, etc., so long as the two motions are distinct. A particular advantage of having the motions be distinct is that the user may rely solely on the sense of touch to operate the device, and may therefore do so effectively in situations wherein the devices are used in dark or sparsely lit areas (e.g., in a user's home at night). In such situations, it would be more difficult to operate the device if the display activation motion and the execution activation motion were the same, but merely followed in sequence, because a light, sound, or other indicator would be required to inform the user whether the next activation motion would be a display activation or an execution activation.

As the preferred embodiment of the present invention is to have only two distinct activation motions associated with each button 15, the examples henceforth will refer to this embodiment. However, the invention is not to be so limited. The two different motions are associated with two different functions in application and/or system software that is preferably integrated into the display device having the buttons 15.

In one embodiment, when the button 15 is activated using an activation motion associated with the first distinct motion, a "pop-up" graphical button or text (e.g., 20a, 20b, 20c, and 20d in FIG. 1) is displayed with text explaining the current function of the physical button 15. Preferably, the location of the graphical buttons 20 are such that they may be easily associated with the physical buttons 15 to which they correspond, as seen in FIG. 1. When the button is activated using an activation motion associated with the second distinct motion, the programmed functionality (i.e., the displayed function 20) for the associated button 15 is executed.

Alternatively, activating a button 15 by performing the button's associated display activation motion may cause a pop-up display of functions for all physical buttons 15, so it is easy to see what all the buttons 15 do just by activating one of them. A novice could then intelligently execute the function associated with any physical button 15 by performing the appropriate execution activation motion associated therewith. Still alternatively, activating a button 15 by performing the button's associated display activation motion may cause a pop-up display of functions for all physical buttons 15 in the same class (i.e. of "like kind"), so it is easy to see what all the buttons 15 of like kind do just by activating one of them. Again, the function ultimately executed would depend on which button the user performed the appropriate execution activation motion to.

In the case where button sets are used, display activation of a particular set may cause display of the function associated with that set, or it may cause display of the functions associated with all similar sets. For example, activating two square buttons by performing the associated display activation motion may cause a display of two squares and an associated function, three squares and an associated function, four squares and an associated function, etc.).

In either case, whether single buttons 15 or button sets are used, there may be an escape sequence to clear the display 25 of clutter. There may be a specific dedicated button for escaping, or the display may be cleared automatically after a predetermined or programmed time delay. The escape sequence may even be simply to repeat the same display activation motion on the same button 15. In the latter case, the first motion causes information to be displayed, while the second, repeat motion causes the information to be cleared. For example, a forward motion would cause display. After the display, a second repeat forward motion would cause the display to be cleared, whereas a different motion (e.g., pushing down), would cause the proper function to be executed.

The latter embodiment might be desirable, because as previously described, using such a repeat sequence is not suitable for displaying and then executing a function, so using the sequence as an escape sequence would not use up a sequence potentially available for other programming. The disadvantages previously described (i.e., the need for an audible or visual indicator), would not be as problematic in this scenario, because the display activation motion is distinct from the execution activation motion, so there is less risk of accidentally executing a function while attempting to display a description of a function on the display 25.

Additionally or alternatively, there may be a predetermined or programmable time delay before which the display 25 automatically clears itself of clutter. Additionally or alternatively, the user could perform the display activation motion associated with a second button or button set to change the display to show the functions associated with the second button or button set. For example, after activating a square button 15 by performing the button's associated display activation motion thereon, and then seeing on the display either the function associated with that button 15, or the functions associated with each square button 15, depending on the embodiment, if the user then performed a proper display activation motion upon a circular button, the system would switch to displaying the function associated with that particular circular button, or all circular buttons, depending on the embodiment.

The software implementation of the behavior of the buttons 15 is also straightforward, and preferably the software is integrated into the device 10 having the buttons 15 and display 25. The device 10 may thus be programmed to improve the overall usability of the present invention. For illustration purposes, the paradigm case of the expert user of a device embodying the concepts of the present invention is someone who is so familiar with the different application screens that he or she always knows which button 15 or button set does what, and never needs to look at the pop-up descriptions 20 for help. The paradigm device is a device such as those described in the '873 application used to control consumer devices, but the device may be any device that implements our multiple-motion programmable function buttons 15. The expert likes to have the extra space on the display 25 for displaying content such as program titles, etc.

Also for illustration purposes, the paradigm case of the novice user is someone who does not know what any of the buttons 15 do, and who would prefer to have the pop-up descriptions 20 of the button functions always present. This novice does not mind sacrificing a little screen space (and hence sometimes needing to do more scrolling to see all the information), in order to have a clearer understanding of exactly what state the device 10 is in.

However, the naive categorization of users into "experts" or "novices" is an oversimplification. In most cases, a single user will be a novice as to the functions of the buttons 15 on some screens (which are used infrequently), but will be an "expert" on the functions of the buttons 15 on screens that he or she uses frequently. In a preferred embodiment, the software may be used to program the device 10 to take these considerations into account as follows.

When a new user first uses a device embodying the concepts of the present invention, the descriptions 20 of the buttons 15 or function keys could appear on all screens, for the entire duration of the user's visit to that screen. The system can keep track for each user of how many times a given screen has been visited, and decrease the amount of time that the description displays remain visible as the number of user visits increase. At any stage, there could be manual override of the automatic description display mechanism. For example, by activating any button 15 three times in rapid succession, the display of all the descriptions could toggle from normally shown to normally hidden and vice versa. Or this can be accomplished by activating only a designated button 15, while such a series of activations to other buttons 15 may be used to indicate to the associated software that the user wishes to toggle the "always shown/always hide" status of those other buttons 15. As described more fully in the '873 application, various users or logical users may have access to the device being used, in which case the associated software would remember the "show/hide" status for all buttons 15 associated with each user, and would reinstate said status upon verification that a particular user was "logged in" to the device.

Additionally, some screens, such as the "welcome screen" shown in FIG. 1, do not have a need to display large amounts of information simultaneously. For these screens, the default state of the graphical buttons 20 may always be set to "show" or "visible". Furthermore, for some users, such as young children, it may be advantageous to always have the descriptions visible, no matter how frequently individual screens are visited. In such cases, the default adaptive behavior of the device may be overridden, by editing the user profiles as described more fully in the '873 and '841 applications.

Software may also be used to achieve dynamic association of functions to physical buttons 15. For example, whether a particular activation motion associated with a particular button is to be treated as a display activation motion, an execution activation motion, or another type of motion, may depend on whether certain other events have occurred prior to the activation motion. The device may be programmed such that a particular motion associated with a particular button is normally to be treated as a display activation motion, but is to be treated as an execution activation motion if the motion is performed within a specified time period after another button has been activated, with no intervening activations. Such dynamic determination of the treatment of an activation motion may be limited to only situations wherein the other (first) button 15 activated was of a "like kind" to the second button 15 and/or was activated by a "like motion".

Thus, the use of physical buttons 15 with programmable functionality and multiple distinct physical motions, in conjunction with a device having a display, have been described and disclosed. Preferably, one of the motions is a display activation motion, and another is an execution activation motion. The concepts of the present invention are applicable to other devices that combine screen usage with physical button inputs, but are most notably beneficial when used in conjunction with hand-held devices or other devices having a small display area 25.

While certain embodiments are illustrated in the drawings and are described herein, it will be apparent to those skilled in the art that many modifications can be made to the embodiments without departing from the inventive concepts described. For example, the associated software discussed herein may be firmware; it may be preloaded, or downloaded from an independent source such as the Internet; it may be programmable using the associated device itself, or it may be programmable using an independent source such as a personal computer or the Internet, etc. Accordingly, the invention is not to be restricted except by the claims which follow.

What is claimed is:

1. A method comprising:
   displaying on a display, in response to a display activation motion performed upon a first button of a plurality of buttons, a description of a function associated with said first button; and
   executing, in response to an execution activation motion performed upon any said first button, the function associated with said first button;
   wherein said display activation motion and said execution activation motion are different motions performed on said first button.

2. The method as in claim 1, wherein the plurality of buttons are on a hand-held device.

3. The method as in claim 2, further comprising removing from the display after a suitable amount of time of non-activity, the description of the function associated with the first button.

4. The method as in claim 2, wherein the display is on the device.

5. The method as in claim 1, further comprising removing from the display, in response to another display activation motion performed upon said first button, the description of the function associated with the first button.

6. The method as in claim 2, further comprising integrating the function associated with any one button of the plurality of buttons using an integrated software.

7. The method as in claim 1 wherein a second button of the plurality buttons is an escape button, the escape button when activated, clearing the description of the function associated with each of the plurality of buttons.

8. The method as in claim 7, wherein the description of the function associated with each of the plurality of buttons is displayed on the display adjacent to the each of the plurality of buttons respectively.

9. A method comprising:
   displaying on a display, in response to a display activation motion performed upon one button set of a plurality of button sets, a description of a function associated with each button set of the plurality of button sets; and executing, in response to an execution activation motion performed upon any one button set of the plurality of button sets, the function associated with that one button set;

wherein said display activation motion and said execution activation motion are different motions performed on said button sets.

10. The method as in claim 9, wherein the plurality of button sets are on a hand-held device.

11. The method as in claim 10, wherein the display is on the device.

12. The method as in claim 9, further comprising programming the functions associated with each button set of the plurality of button sets using an integrated software.

13. A method comprising:

recognizing activation of one button of a plurality of buttons in response to an activation motion performed upon that one button;

executing a function associated with the one button if the activation motion is an execution activation motion upon that one button; and displaying on a display, a description associated with the function associated with each of the plurality of buttons, if the activation motion is a display activation motion upon that one button;

wherein said display activation motion and said execution activation motion are different motions performed on said one of said plurality of buttons.

14. The method of claim 13, wherein the plurality of buttons are on a hand-held device.

15. The method of claim 14, wherein the display is on the device.

16. A system comprising:

a device having a plurality of buttons; and a display;

wherein activation of one button of the plurality of buttons by a display activation motion causes a description of each button of the plurality of buttons to be displayed on the display, and activation of any one button of the plurality of buttons by an execution activation motion causes the function associated with that one button to be executed, wherein said display activation motion and said execution activation motion are different motions performed on said buttons.

17. The system of claim 16, wherein the plurality of buttons are on a hand-held device.

18. The system of claim 17, wherein the display is on the device.

19. An apparatus, comprising;

a display; and a button of a plurality of buttons having an execution motion and a display motion so that the display motion on the button causes a description of a function associated with each of the plurality of buttons to be presented on the display and the execution motion of any one button of the plurality of buttons causes execution of the function associated with that one button, wherein said display activation motion and said execution activation motion are different motions performed on said button.

20. The apparatus of claim 19, wherein said function is programmable.

21. The apparatus of claim 19, wherein said apparatus is a hand-held device.

22. A method comprising:

activating a display activation motion from a button of a plurality of buttons to cause a description of function of each of the plurality of buttons to be presented on a display; and activating an execution activation motion from any button of the plurality of buttons to cause execution of the function of that button, wherein said display activation motion and said execution activation motion are different motions performed on said button.

23. The method of claim 22, wherein the execution activation motion is performed upon the button and is not necessarily proceeded by the display activation motion.

* * * * *